United States Patent [19]
Parker et al.

[11] 3,821,448

[45] June 28, 1974

[54] PROCESS FOR IMPROVING THE FLAVOR STABILITY OF PEANUT BUTTER

[75] Inventors: Wilbur Allen Parker, Somerville, N.J.; Guillermo German Bordt, Pleasant Hill; Holger Larsen, Kensington, both of Calif.

[73] Assignee: CPC International Inc., Englewood Cliffs, N.J.

[22] Filed: Dec. 21, 1971

[21] Appl. No.: 210,554

[52] U.S. Cl. ............................. 426/397, 426/486
[51] Int. Cl. .............................................. A23l 1/38
[58] Field of Search ....... 99/128, 126; 426/397, 486

[56] References Cited
UNITED STATES PATENTS

| | | | |
|---|---|---|---|
| 2,976,154 | 3/1961 | Brown | 99/128 |
| 3,246,991 | 4/1966 | Avera | 99/128 |
| 3,266,905 | 8/1966 | Baker | 99/128 |
| 3,892,662 | 7/1971 | Gooding | 99/128 X |

FOREIGN PATENTS OR APPLICATIONS

| | | | |
|---|---|---|---|
| 628,129 | 9/1961 | Canada | 99/128 |

*Primary Examiner*—Robert Halper
*Attorney, Agent, or Firm*—Albert P. Halluin

[57] ABSTRACT

A process for improving the flavor stability of peanut butter comprising holding peanut butter under vacuum with mild agitation to deaerate the peanut butter, and packing the peanut butter under nitrogen.

5 Claims, No Drawings

PROCESS FOR IMPROVING THE FLAVOR STABILITY OF PEANUT BUTTER

BACKGROUND OF THE INVENTION

1. Field of the Invention

The field of this invention relates to peanut butter.

2. Description of the Prior Art

Freshly made peanut butter presents a fresh, mild sweet flavor which is quite different from the flavor of the peanut butter normally encountered in commerce. This is because the flavor of the peanut butter changes rapidly with age. Much effort has been directed to preparing peanut butter which after aging retains the aroma and flavor of freshly made peanut butter.

U.S. Pat. No. 2,521,543 to Mitchell notes the importance of avoiding undue incorporation of oxygen into a peanut butter product to avoid rancidity and off flavors.

It is known that oxygen is ordinarily present in adsorbed and entrained form in blanched and roasted peanuts prior to grinding. Furthermore, in the manufacture of peanut butter, additional atmospheric oxygen is incorporated to the point of saturation of the ground peanut butter mass. Solid sweeteners such as dextrose, or sucrose also contain entrained oxygen; therefore, additional oxygen can become dissolved, adsorbed, and entrained in the peanut butter during the mixing and agitation of the sweetener with the other components of the peanut butter mass.

Methods for removing dissolved, adsorbed and entrained oxygen from peanut butter are known. For example U.S. Pat. No. 3,266,905 to Baker et al. discloses a process for improving the flavor stability of peanut butter involving removing dissolved, adsorbed and entrained oxygen therefrom by an operation involving (1) repeatedly injecting inert gas into peanut butter under pressure and flashing the peanut butter to substantially atmospheric pressure to remove oxygen, and (2) packing the resulting deaerated peanut butter in a substantially oxygen-free atmosphere such that the peanut butter contains no more than about 0.5 volume percent of dissolved, adsorbed, entrained and assessable oxygen. This patent teaches that it is necessary that the peanut butter contain not more than 0.5 volume percent oxygen in order to eliminate staling, rancid and off flavors on aging. (See, for example, Col. 5, lines 66–74). Unfortunately, this process is extremely cumbersome in practice, requires more costly equipment, and can remove a portion of desirable peanut flavor volatiles.

U.S. Pat. No. 3,592,662 to Gooding discloses a process for treating peanut butter comprising substantially instantaneously removing volatiles therefrom by subjecting an agitated thin film of peanut butter at a temperature of at least 180°F to a vacuum, as for example, temperatures of from 200°F to 275°F and a vacuum of from 27 to 29 inches of mercury. This process can remove dissolved and entrained gases from peanut butter. (See, U.S. Pat. No. 3,246,991 to Avera). This process can also be cumbersome in practice and remove a portion of desirable peanut flavor volatiles. Subjecting peanut butter to such a process employing less rigorous conditions, i.e., lower vacuum pressures and temperatures, removes a portion of dissolved and entrained oxygen, but such a process can leave behind considerably more than the 0.5 volume percent oxygen which the prior teaches will cause staling on aging.

In summary, prior art processes can effectively remove much of the oxygen dissolved and entrained in peanut butter, and the resulting deaerated peanut butter can exhibit improved flavor stability. While these processes can result in peanut butters which exhibit improved flavor stability, the deaerating procedures involved are cumbersome, costly, and can be so rigorous that in removing dissolved or entrained oxygen a portion of desired volatile roasted peanut flavor is also removed.

A superior process would improve the flavor stability of peanut butter, remove a minimum of peanut flavor and aroma volatiles, and be more convenient to practice than prior art processes.

SUMMARY OF THE INVENTION

This invention presents a process for improving the flavor stability of peanut butter comprising (1) holding freshly prepared ground peanut butter for about 5 to 15 minutes at a temperature from 130°F to 180°F at a vacuum of 22 to 29 inches of Hg, (2) rapidly chilling the peanut butter to a temperature less than about 100°F to substantially crystallize the glyceride solids of higher melting point in the peanut butter, and (3) packing the cooled peanut butter in a substantially oxygen-free atmosphere. Surprisingly it has been found that this process involving mild deaeration conditions which can leave in the peanut butter more than 0.5 volume percent oxygen and as much as 1.0 volume percent oxygen and then packing in an oxygen-free atmosphere gives a peanut butter product that exhibits excellent flavor stability and improved fuller flavor and fresher aroma.

DISCUSSION OF THE INVENTION AND ITS PREFERRED EMBODIMENTS

This invention involves a process for improving the flavor stability of peanut butter comprising (1) holding freshly prepared peanut butter for about 5 to 15 minutes at a temperature of from 130°F to 180°F at a vacuum of from 22 to 29 inches of Hg to deaerate the peanut butter and (2) rapidly chilling the peanut butter to a temperature less than about 100°F to substantially crystallize the glyceride solids of higher melting point in the peanut butter, and (3) packing the crystallized peanut butter in a substantially oxygen free atmosphere.

Freshly prepared peanut butter suitable for use in this invention can be prepared by any suitable process. For example, a suitable conventional process for making peanut butter comprises the steps of roasting shelled peanuts, cooling and blanching the peanuts, removing the nibs, electronically sorting and hand picking objectionable peanuts for discard, grinding the peanuts that passed inspection, mixing sugar and salt flavorings with the ground peanuts, and then preferably regrinding the mixture to obtain a finely ground peanut butter.

For use in this invention, finely ground stabilized peanut butters are preferred. Peanut butter stabilizers prevent the oil in peanut butter from separating from the remainder of the peanut constituents after the peanut butter has been packed. In making a stabilized peanut butter a stabilizing agent can, for example, be introduced prior to the last grinding operation. These stabilizing agents work by forming, on cooling, a network of interlacing crystals of the fats of higher melting point in the peanut butter which effectively preclude migration of the peanut and other solid particles from the oil phase and thus prevent separation of the peanut butter into two distinct layers. Stabilizers can be used in place of, or in conjunction with, peanut oil released during the grinding of peanuts or along with added peanut oil.

The stabilizing agents generally consist of substantially completely saturated triglyceride fats (hardstock), such as hydrogenated peanut oil and hydrogenated cottonseed oil, which have higher melting points than peanut oil. Other fats, such as hydrogenated or partially hydrogenated soybean oil, cottonseed oil, corn oil, lard and tallow, as well as the monoglycerides, diglycerides, and polyglycerol esters of these fats and mixtures of the above can be employed.

Suitable stabilized peanut butters can, for example, consist of from about 90 to 95 percent ground roast peanuts, from 2 to 5 percent stabilizers and about 1 to 5 percent sugars and salt. The exact composition of the peanut butter to be treated by the process of this invention is not critical. For the process to be of optimum usefulness, however, the peanut butter should be freshly prepared.

It is essential that stabilized peanut butters containing about 2 percent or more by weight hardstock as a stabilizing agent be deaerated at temperatures above about 130°F since below that temperature the peanut butter becomes viscous and hard to pump due to the crystallization of the hardstock. It is preferred for the purposes of the deaeration process described herein that the processing of peanut butter be carried out at temperatures ranging from about 130°F to about 180°F. At these temperatures peanut butter is fluid and pumpable, and can be considered a slurry of edible oil, peanut particles, salt and sugar. In deaerating the peanut butter, preferably the peanut butter is held for from about 5 minutes to 15 minutes at a temperature of from 140°F to 160°F and a vacuum of from 23 to 28 inches of Hg, and mildly agitated. Temperatures higher than 180°F and vacuum pressures in excess of 29 inches Hg can and should be avoided since these more rigorous deaerating conditions are cumbersome in practice and can remove desirable peanut flavor volatiles. For similar reasons, holding times significantly longer than 15 minutes should be avoided. A holding time of from about 7 to 12 minutes is most preferred.

After the peanut butter has been deaerated, it is rapidly chilled to below about 100°F for packing. Suitable methods of chilling peanut butter are well known. For example, a cooling unit of a type commonly known as a scraped wall heat exchanger can be employed.

The peanut butter is then packed in final containers in a substantially oxygen-free atmosphere. Conventional inert gas blanketing methods such as commonly used in the canning industry are suitable. Inert gas canning is accomplished by blanketing the peanut butter in its container with a non-reactive gas or by use of a vacuum to draw away oxygen or air from the headspace in the container prior to introducing the inert gas before capping. During this final gas canning step, the headspace of the filled container is rendered substantially oxygen-free. Preferably the headspace contains less than 2 percent, by volume, oxygen as measured at standard temperature and pressure (S.T.P.). The container is then sealed with an air tight seal for example a suitable cap. Especially suitable gases which are non-reactive with peanut butter and can be used in this process are nitrogen and carbon dioxide.

The example which follows provides a detailed description of a preferred embodiment of the present invention. Obviously, many modifications are available to those skilled in the art and this invention is limited only by the appended claims.

EXAMPLE

Peanuts are roasted in an atmosphere of 400°F to a peak roast in color and flavor and to a moisture content of 1.5 percent. After having been cooled by forced air blown over the roasted nuts, the peanuts at about 100°F are blanched for removal of the skins and nibs. Defective nuts are eliminated by electronic sorting and handpicking. The remaining roasted peanuts are subjected to an initial grinding under air to form a peanut paste. To the ground peanut paste, at a temperature of about 140°F, are added stabilizing agent, sugar and salt. The resulting peanut butter has the following composition:

| Ingredient | Parts by weight |
|---|---|
| Peanuts, roasted, blanched and ground | 90.25 |
| Stabilizing agent* | 6.0 |
| Sugars and salt | 3.75 |

* 3.5 parts of non-hydrogenated peanut oil; 2.5 parts of a partially hydrogenated vegetable oil of 136°F melting point (Wiley).

The peanut butter is blended for a period of about 15 minutes under air while maintaining product temperature at about 140°F. The mix is given a second and final grind. The peanut butter slurry at about 155°F is transferred to a deaeration kettle and held at 155°F under 25 inches vacuum with mild agitation for about 8 minutes. The peanut butter is then transferred to a heat exchanger, and the temperature of the peanut butter is then lowered to about 115°F in one unit of the heat exchanger; the peanut butter is then quickly chilled through a second unit of the heat exchanger to a temperature of about 80°F. The peanut butter is then packed in glass jars and capped under nitrogen, such that the oxygen in headspace is less than 2 percent, by volume, of the headspace gas.

At the time of packing, an analysis of this peanut butter was conducted following the method described in U.S. Pat. No. 3,266,905, Col. 10, lines 27–46. The peanut butter contained about 0.8 volume percent oxygen.

The peanut butter prepared according to this process presents a delectable flavor and aroma and exhibits excellent stability on aging in that this delectable flavor and aroma is substantially retained after 9 months at room temperature.

Packing from about 3 ounces to 80 ounces of peanut according to the process of this invention in containers with a sealable opening, as for example a glass jar, wherein the headspace volume is from about 10 cc to about 100 cc is especially advantageous in that on opening the sealed container a readily detectable roast peanut aroma is present.

For example, as in Example 1, the following amounts peanut butter were packed in cylindrical glass jars having the following diameters and resulting headspace volumes:

| Weight of Peanut Butter | Headspace Volume (cc) | Diameter (mm) |
|---|---|---|
| 6 oz. | 21.5 | 53 |
| 12 oz. | 43.0 | 73 |
| 18 oz. | 61.0 | 73 |
| 28 oz. | 86.0 | 89 |
| 40 oz. | 87.5 | 89 |

A strong roast peanut aroma was readily detectable when these containers were opened.

What is claimed is:

1. A process for improving the flavor stability of peanut butter comprising
   1. holding freshly prepared peanut butter for about 5 to 15 minutes at a temperature of from 130°F to 180°F at a vacuum of 22 to 29 inches of Hg with mild agitation, to deaerate the peanut butter to an oxygen content of about 0.8 volume percent.
   2. rapidly chilling the deaerated peanut butter to a temperature less than about 100°F to substantially crystallize the glyceride solids of higher melting point in the peanut butter, and
   3. packing the crystallized peanut butter in a substantially oxygen-free atmosphere.

2. The process of claim 1 wherein the oxygen-free atmosphere is nitrogen.

3. The process of claim 2 wherein the peanut butter is held at a temperature of from 140°F to 160°F.

4. The process of claim 3 wherein the peanut butter is held at a vacuum of 23 to 28 inches Hg.

5. The process of claim 1 wherein the peanut butter is held for 7 to 12 minutes at a temperature of from 140°F to 160°F at a vacuum of 23 to 28 inches Hg and packing the peanut butter under a nitrogen atmosphere having less than 2 percent, by volume, oxygen.

* * * * *